No. 681,393. Patented Aug. 27, 1901.
G. A. HAWVER.
BREASTPIN OR THE LIKE.
(Application filed Mar. 6, 1901.)

(No Model.)

Witnesses
Geo. H. Dynne
Fred Englert

Inventor
George A. Hawver,
by Wilkinson & Fisher,
Attorneys

UNITED STATES PATENT OFFICE.

GEORGE A. HAWVER, OF JACKSON, OHIO.

BREASTPIN OR THE LIKE.

SPECIFICATION forming part of Letters Patent No. 681,393, dated August 27, 1901.

Application filed March 6, 1901. Serial No. 50,088. (No model.)

*To all whom it may concern:*

Be it known that I, GEORGE A. HAWVER, a citizen of the United States, residing at Jackson, in the county of Jackson and State of Ohio, have invented certain new and useful Improvements in Breastpins or the Like; and I do hereby declare the following to be a full, clear, and exact description of the invention, such as will enable others skilled in the art to which it appertains to make and use the same.

My invention relates to improvements in fastenings for breastpins, brooch-pins, emblem-pins, and the like; and it consists of certain novel features hereinafter described and claimed.

Reference is had to the accompanying drawings, in which the same parts are indicated by the same letters throughout the several views.

Figure 1:
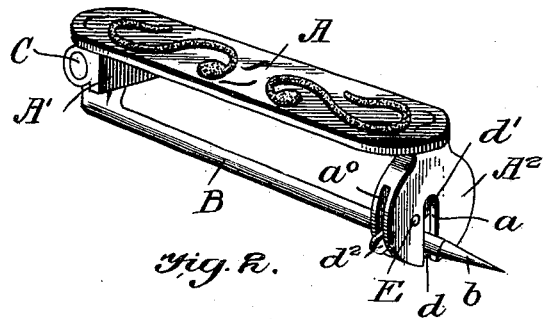
Figure 2:
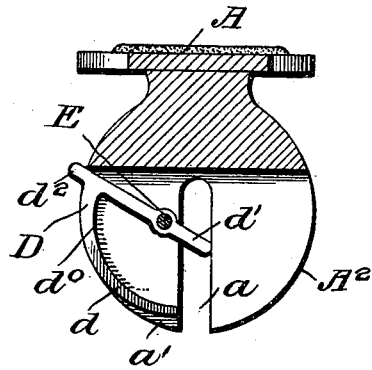
Figure 3:
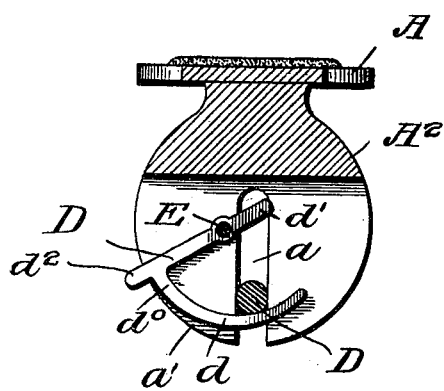

Figure 1 represents a perspective view of an emblem-pin fitted with my improved fastening device. Fig. 2 is a detail view showing a transverse section through the lug in which the hook is pivoted and with the hook in an open position, and Fig. 3 is a similar view showing the hook in a closed position.

A represents the body of the brooch or emblem pin, provided with lugs $A'$ and $A^2$. The resilient pin B is pivoted at one end on the pivot-pin C, while the pointed end $b$ of the said pin projects through the slot $a$ in the lug $A^2$. This lug is also provided with a transverse slot $a^0$, (see Fig. 1,) in which slot the hook D is pivoted, as on the pivot E. This hook D is provided with a curved engaging member $d$, an arm $d'$, projecting across the slot $a$ when the hook is in the open position, as shown in Fig. 2, and also with a thumb-lug $d^2$, projecting beyond the curved face $a'$ of the lug $A^2$.

The operation of the device is as follows: The pin B, being out of engagement with the slot $a$, is inserted in the material to which the brooch or emblem pin is to be attached, and then the free end of the pin is brought up into the slot $a$ until it strikes the arm $d'$ on the hook D. This will cause the hook to rock about the pivot E, bringing the member $d$ across the slot $a$ to the position shown in Fig. 3. Now if the pin B be released its resiliency will cause it to spring back against the member $d$ and the friction will be sufficient to keep the hook D from swinging back out of engagement. It will be obvious that if the thumb-lug $d^2$ be swung farther to the right in Fig. 3 until the pin reaches the point $d^0$ of the hook D the said hook will give a firmer support to the pin.

It will be seen that the mere insertion of the end of the pin B in the slot $a$ will automatically cause the hook to operate and that the hook will be protected by means of the side walls of the transverse slot $a^0$, and thus prevent it from catching in the material of the dress of the wearer and also protect it from injury.

Having thus described my invention, what I claim, and desire to secure by Letters Patent of the United States, is—

In a brooch or breastpin or the like, the combination with the body portion provided with lugs projecting rearwardly therefrom, one of said lugs being longitudinally and transversely slotted, of a resilient pin pivoted to the opposite lug and passing through one of said slots, and a hook-shaped member rotatably mounted in said transverse slot, the pivotal center of said hook being at one side of said longitudinal slot, a curved projection carried by said hook-shaped member, adapted to retain said pin in said slot, and a projection also provided upon said hook-shaped member, and extending across said longitudinal slot in both the open and closed positions of said hook-shaped member, substantially as described.

In testimony whereof I affix my signature in presence of two witnesses.

GEORGE A. HAWVER.

Witnesses:
R. U. WILSON,
JOHN W. HOOD.